July 12, 1955     B. H. BILLINGS     2,713,025
METHOD OF PHOTO-CHEMICAL SEPARATION
Filed Aug. 27, 1951     5 Sheets-Sheet 1

INVENTOR.
Bruce H. Billings
BY

United States Patent Office 2,713,025
Patented July 12, 1955

2,713,025
METHOD OF PHOTO-CHEMICAL SEPARATION

Bruce H. Billings, Lincoln, Mass., assignor to Baird Associates, Cambridge, Mass., a corporation of Massachusetts Application August 27, 1951, Serial No. 243,839

7 Claims. (Cl. 204—157)

This invention relates to an improved method of photo-chemical separation applicable especially to isolating a single isotope from a mixture of isotopes of the same element. The term "photo-chemical separation" as employed herein is intended to refer to a separation based upon a chemical reaction which is stimulated by absorption of light in at least one of the elements entering into the reaction.

Isotope separation presents an unusually difficult problem. In theory a number of physical processes may be used for the separation of isotopes. Thus, gaseous diffusion, thermal diffusion, electro-chemical deposition, diffusion in a centrifugal force field, are all processes in which it is theoretically possible to gain some separation of different isotopes. In all of these known processes the different atoms of the material which is involved are under the influence of some type of force field, which field operates to a slightly greater extent on one isotope of a material than it does on another.

It is to be noted that the final separation which is achieved in any one of such processes is usually some function of the mass ratio. Typical separation factors for processes known to the art have been determined, and in every instance have been found to be extremely small. In the practical separation of isotopes, therefore, it is necessary to use many separation stages in order to obtain an overall separation which is useful.

The present invention deals with the problem indicated and aims to devise an improved method of isotope separation in which the separation factor will not be a function of the masses employed, but in which this factor will be extremely high in number.

It is a further object of the invention to provide a novel method of photo-chemical separation which is relatively simple to practice; which is economically feasible; and which can be conveniently and rapidly carried out, utilizing a minimum amount of equipment.

These and other objects and novel features will be more fully understood and appreciated from the following description of a preferred embodiment of the invention selected for purposes of illustration and shown in the accompanying drawings, in which Fig. 1 is a diagrammatic view illustrating apparatus employed in carrying out the method of the invention;

Figure 1:
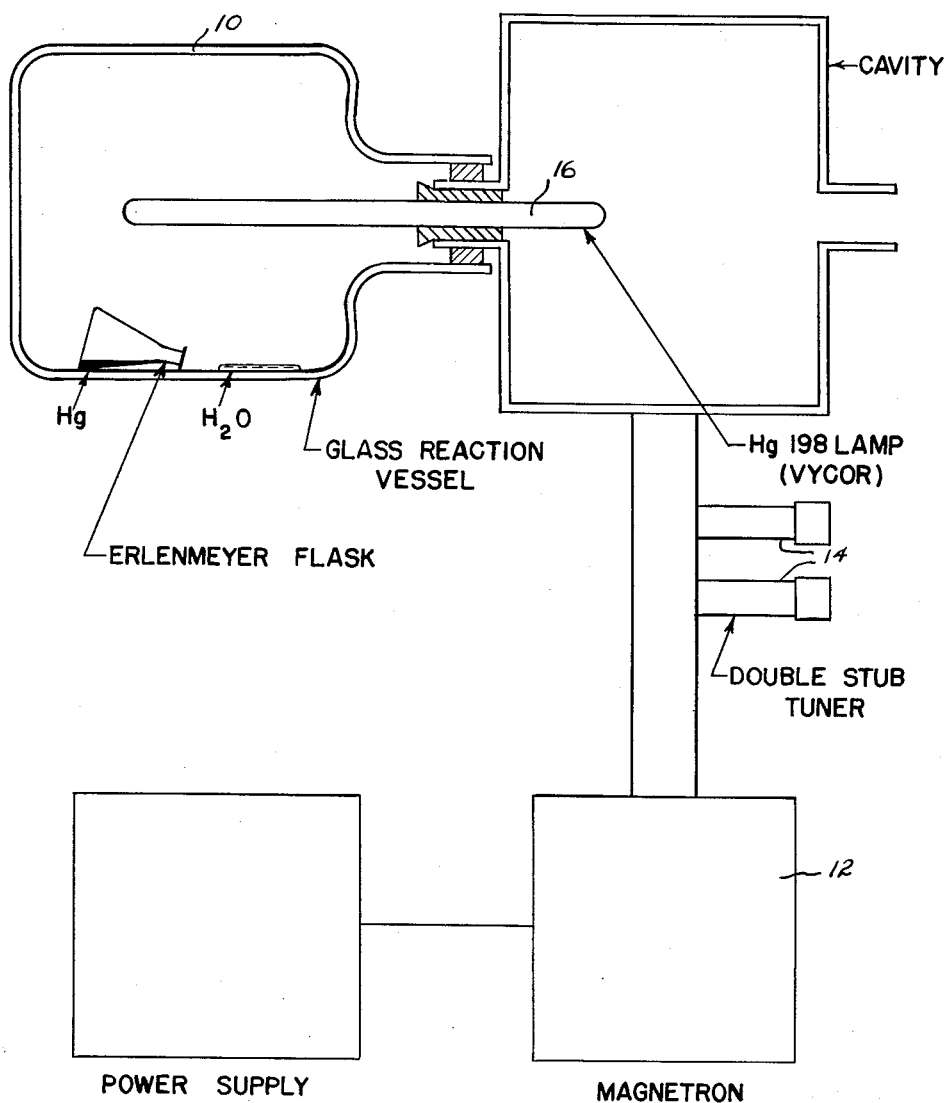

In general, I have discovered that the foregoing objectives may be realized by an improved method of photo-chemical separation of isotopes. I find that I may successfully employ light to radiate an isotopic mixture and thereby produce a photo-chemical reaction forming a basis for isolating a single isotope.

Essentially the method, in one preferred form, may be said to comprise the bringing together of a fluid mixture of isotopes and a reacting substance, and then subjecting the fluid isotopic mixture to the action of light to selectively excite or stimulate one of the component isotopes of the mixture and to cause the stimulated isotope to chemically combine with the said reacting substance. The chemical compound thus produced may be recovered in the manner known to the art and thereafter resolved into its constituent elements.

It is an essential feature of the method of the invention that the isotopic mixture can be radiated with light of wave lengths so chosen that only one of the isotopes in the mixture is excited and becomes capable of undergoing a photo-chemical reaction with the reacting substance noted.

It should also be observed that use of light for radiating an isotopic mixture in this way and producing a photo-chemical reaction is to be distinguished from use of light to promote dissociation of one particular isotope combination and thereafter causing a chemical reaction which is not truly a photo-chemical reaction.

Thus, in one instance, the molecule of material may, in accordance with the method of the invention, be irradiated with light of such wave lengths that one particular combination is dissociated, whereas the energy is not sufficient to dissociate another combination.

In a second instance an atom may, by the method of the invention, be raised to an excited state by irradiation of light with an appropriate wave length.

In the first above noted instance it is necessary to find a succeeding chemical reaction which will immediately capture the dissociated atom or radical.

In the second above noted instance it is necessary to find a true photo-chemical reaction which will take place between the excited atom and another reacting material.

It is to be noted that the main problem in either of these separation methods is to obtain sufficient light at the wave length region to produce the desired reaction. In every case it will be obvious that this wave length region is extremely narrow. The energy required to dissociate a molecule of one isotopic species is usually quite close to the energy required to dissociate another isotopic species. Similarly, the energy to raise one isotope to an excited state is extremely close to the energy required to raise another isotope of the same material to an excited state.

As illustrative of one specific example of applying the method of the invention there may be cited the separation of one of the isotopes of mercury. As is well known, there are a number of isotopes of this element, of which one is mercury 198. It has also been known that mercury vapor when irradiated with the 2537 Å. resonance line will combine with water to form mercuric oxide. It was contemplated that it should be possible to radiate mercury vapor with 2537 Å. light from pure mercury 198, in which case the reaction would involve only mercury 198 and the mercuric oxide should be considerably enriched in mercury 198.

In carrying out the method of the invention with this element, therefore, a small quantity of ordinary mercury was placed in a glass reaction vessel, as suggested in Fig. 1. Also placed in the reaction vessel was a small quantity of water. Suitable means were employed to warm the mercury and produce a desired concentration of mercury vapor in the reaction vessel.

The isotopic mixture of mercury vapor thus contained, in the presence of water, was radiated by light produced from one or more mercury discharge tubes. These tubes were manufactured from mercury 198 which was obtained from gold which had been radiated in the pile at Oak Ridge. Accordingly, this mercury 198 was extremely ure and provided the necessary narrow wave lengths to excite mercury 198 in the isotopic mixture. The tubes were made of Vycor glass so that a large percentage of the radiation would escape.

It was known that for a given power input the brightness and life of a mercury discharge tube would increase with frequency. Accordingly, excitation was done with a magnetron at approximately 3,000 megacycles. As illustrative of one convenient means of arranging the discharge tube and magnetron, in proper relation to one another, the tubes were placed in a hollow body 10 having a resonant cavity which was coupled to the magnetron 12 through a double stub tuner 14, as shown in Fig. 1. The reaction vessel was arranged at a point outside of the resonant cavity in a position to partially enclose the mercury discharge tube 16. Dry nitrogen was sent through this tube so that there would be no atmospheric oxygen present in the reaction chamber.

After exposure of the mercury vapor and water to light from the mercury 198 in the discharge tube, a deposit was immediately observed on the reaction vessel. This deposit resulted from the reaction of water and mercury 198 to form mercuric oxide. Mercury 198 was then recovered by the process of amalgamation with a copper wire. The mercury from the copper wire was then dissolved and distilled into a discharge tube which was sealed off and examined.

Examination of the material recovered using standard Fabry-Perot spectroscope techniques showed (as seen by comparison of Figs. 3 and 4) that there had been a very considerable enrichment of the mercury 198 showing that the method of the invention is capable of providing for a very high separation factor which may vary throughout a considerable range of values but which, in any event, will always greatly exceed the separation factors of the earlier known methods referred to above.

From this fact the very important conclusion may be drawn that it is entirely practical and feasible to develop adequate light intensities in very narrow wave lengths to actively stimulate an isotope in a mixture and simultaneously induce a photo-chemical reaction of practical recovery value.

Figure 3:
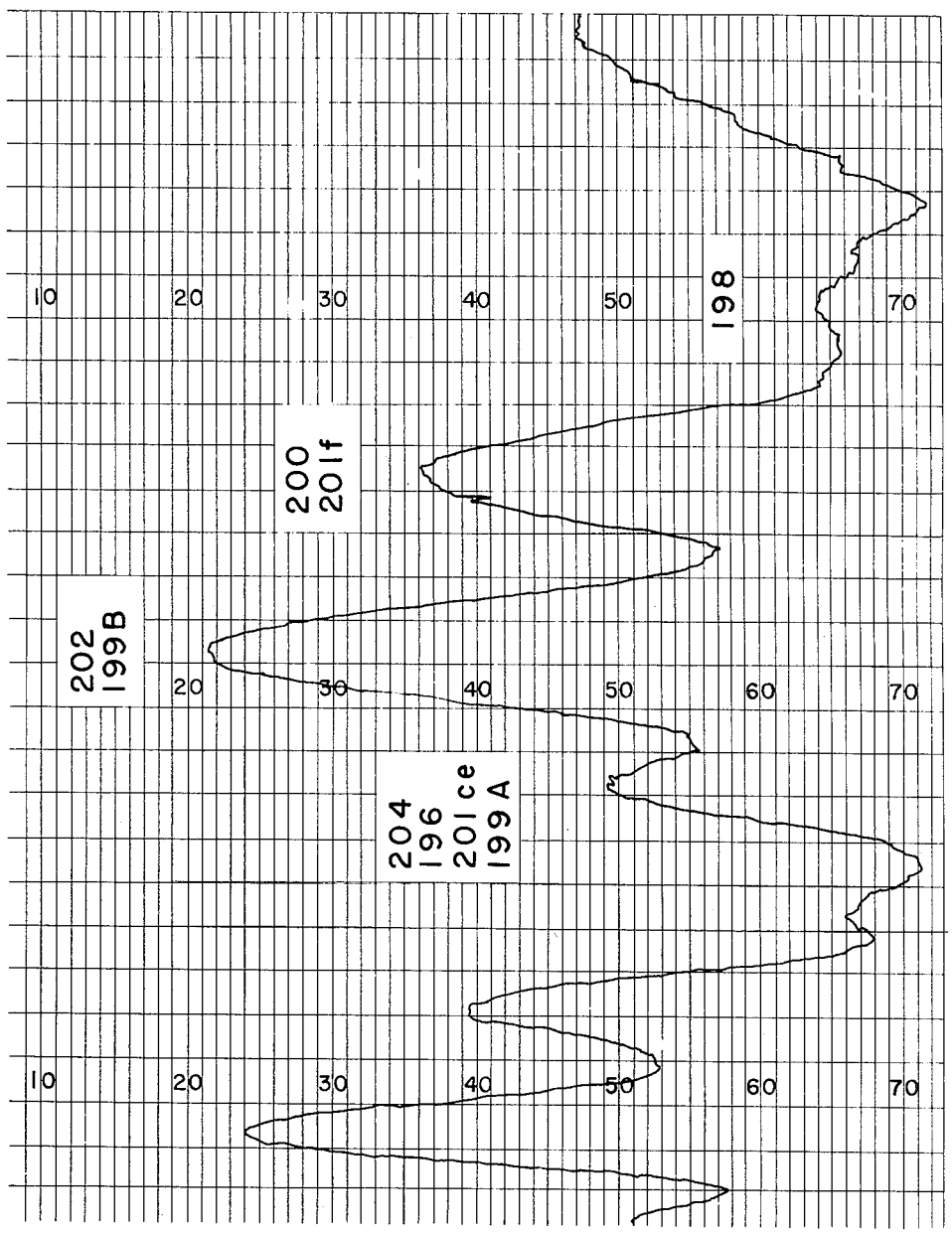
Fig. 3 is a diagram of a fringe pattern of natural mercury.
Figure 4:
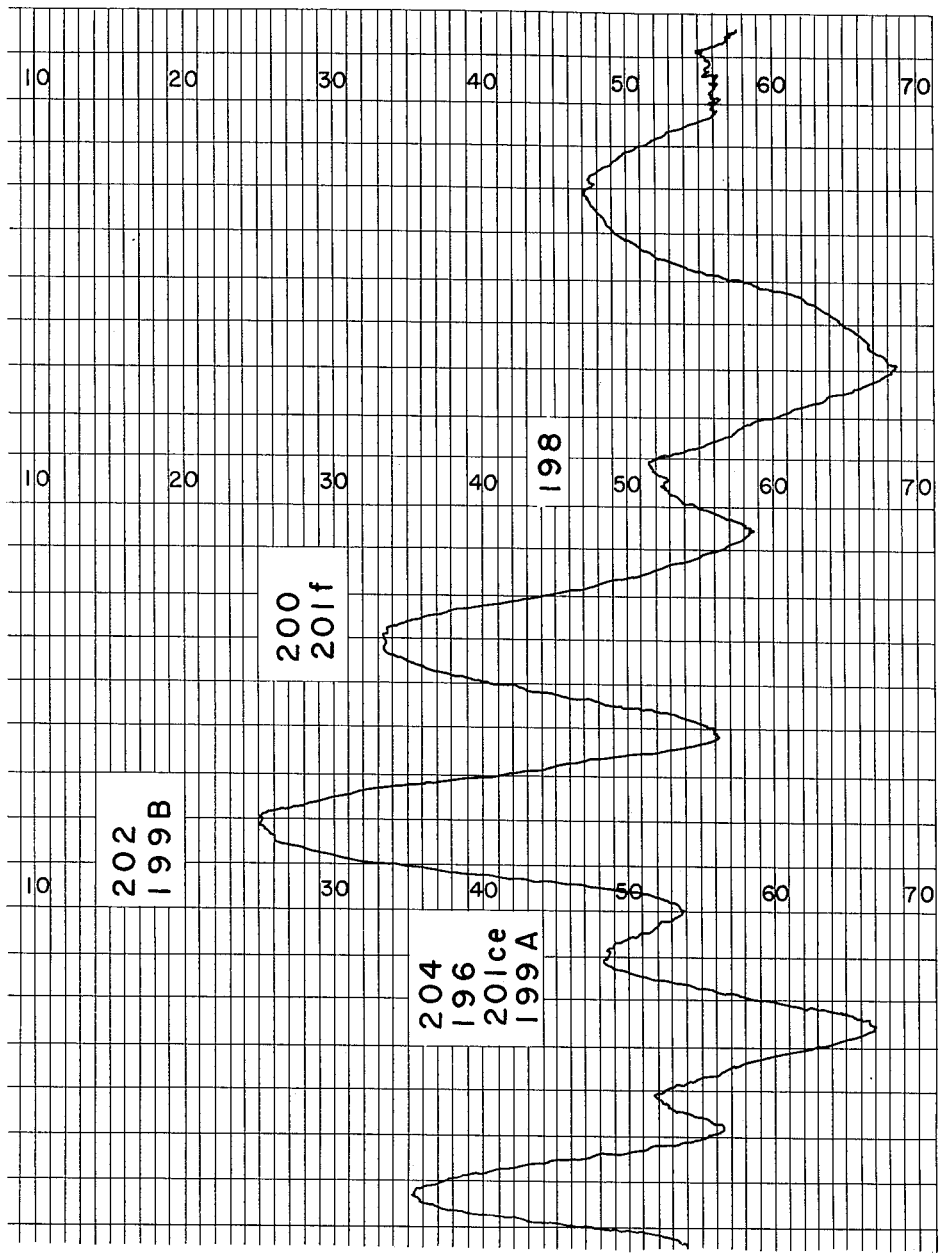
Fig. 4 is a diagram showing a fringe pattern of irradiated mercury.

Evaluations of the results of the above procedure were based upon an examination of Fabry-Perot fringe patterns obtained with natural mercury, as shown in Fig. 3, and Fabry-Perot fringe patterns obtained with irradiated mercury, as shown in Fig. 4. It is quite clear from an inspection of the later fringe pattern that there has been a considerable enrichment of the isotope mercury 198. The precise manner in which measurement of the separation was made is hereinafter described in detail.

It will be appreciated by those skilled in the art that there have been extensive discussions of reactions postulated in the literature involving photo-chemical reactivity between excited mercury vapor and various materials. In none of these, so far as I am aware, has research allowed any definite statement to be made as to the validity of the reactions. It is pointed out that the experiments embodied in this invention now at last provide a basis for drawing a definite conclusion about some of these postulated reactions.

The first of these reactions which can be definitely asserted is as follows:

(A) 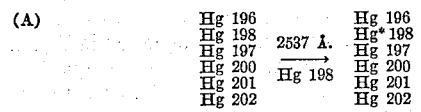

The next reaction has been proven to be as follows:

(B)     $Hg^* \ 198 + H_2O \rightarrow Hg \ 198 \ H + OH$

Finally, a third reaction is as follows:

(C)     $Hg \ 198 \ H + OH \rightarrow HgO + H_2$

*The measurement problem*

One of the problems connected with the development of any process of isotopic separation is the determination of the separation which has been achieved. This imposes a measurement problem which is frequently extremely difficult as not only are the quantities small but also the separations are small.

The procedure used in the analysis of the invention was strictly spectrographic and employed well-known techniques.

The measurement was made with the 5461A line of mercury. This was obtained by recovering the mercury from the reaction chamber using procedures mentioned above and then using a portion of this mercury as a spectrographic light source. The 5461A line was examined with a Fabry-Perot interferometer. A photograph was made of the fringe pattern and a record densitometer was used to trace the figures.

Figure 2:
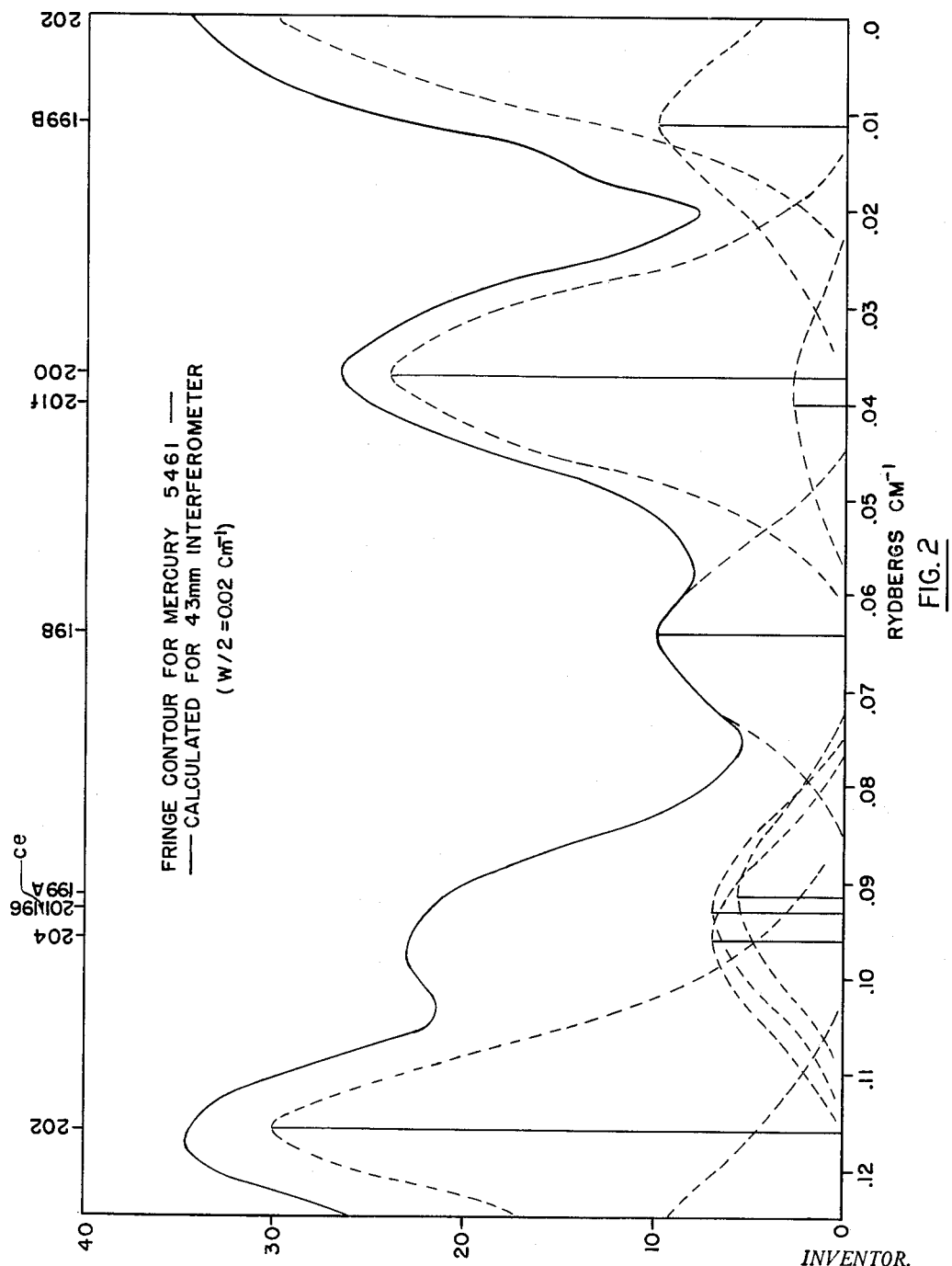
Fig. 2 is a graph of experimental data utilized in the invention.

In Fig. 2 is shown a curve of the fringe pattern obtained with a Fabry-Perot interferometer and natural mercury with a 37 millimeter spacer. This pattern was obtained with the assumption that the instrumental and Doppler width of the components was 0.02 cm.$^{-1}$. With this spacer the 198 component overlaps with a 199 component. Accordingly, a calculation was made to discover the separation which would isolate the 198 line from the remainder of the hyperfine structure to yield a value of 43 millimeters for the spacing.

Fig. 3 shows the densitometer curve of the fringe pattern obtained with natural mercury with a 43 millimeter spacer using 0.02 reciprocal cm.$^{-1}$ power as a value of the instrumental width and Doppler width.

Fig. 4 shows the densitometer curve of the fringe pattern obtained from mercury recovered from the reaction chamber in accordance with the invention. It is pointed out that the relative intensity of the line labelled 198 is materially greater in Fig. 4 than in the case of natural mercury in Fig. 3. Using standard spectrographic calculations, it is apparent that the proportion of mercury 198 has increased by 50% in the enriched sample as compared with natural mercury.

*Re Figs. 3 and 4*

In order to make the calculation, it is necessary to obtain from the densitometer traces in Figs. 3 and 4, a measure of the intensity of the spectrum line under consideration. This intensity is the difference between the minimum reading and the reading at the peak of the line. In Fig. 3 the reading is 72 (minimum Hg 198)—64 (maximum Hg 198) or 8 divisions on the chart for the concentration of Hg 198 in natural mercury. In Fig. 4 the reading is 68 (minimum Hg 198)—52 (maximum Hg 198) or 16 divisions on the chart for the concentration of Hg 198 in the enriched sample. The ratio of these two readings is multiplied by a standard spectrographic correction factor to give the percentage increase of 50% as stated above.

By other experiments percentage increases of 25% to 40% and ranging up to 60% were obtained.

Mercury was chosen for the reaction because there was already in the literature evidence of a photo-chemical reaction of mercury with water to form mercuric oxide. There was also another strong reason for using this particular element. This reason was the large separation of the hyperfine components in the exciting radiation. The exciting radiation of mercury 198 as represented by the separations and intensities of the hyperfine components of the 2537 line 5 has a fine structure which is quite different from the structure of the 5461 line.

It is intended that in carrying out by improved invention I may further employ the various agencies which have been utilized, as indicated above, in various modified forms, including the use of not only one, but a plurality of, sources from which narrow wave length radiations are obtained, and such multiple light sources may be applied in some desired sequence, or at one and the same time in conjunction with one another.

Figure 5:
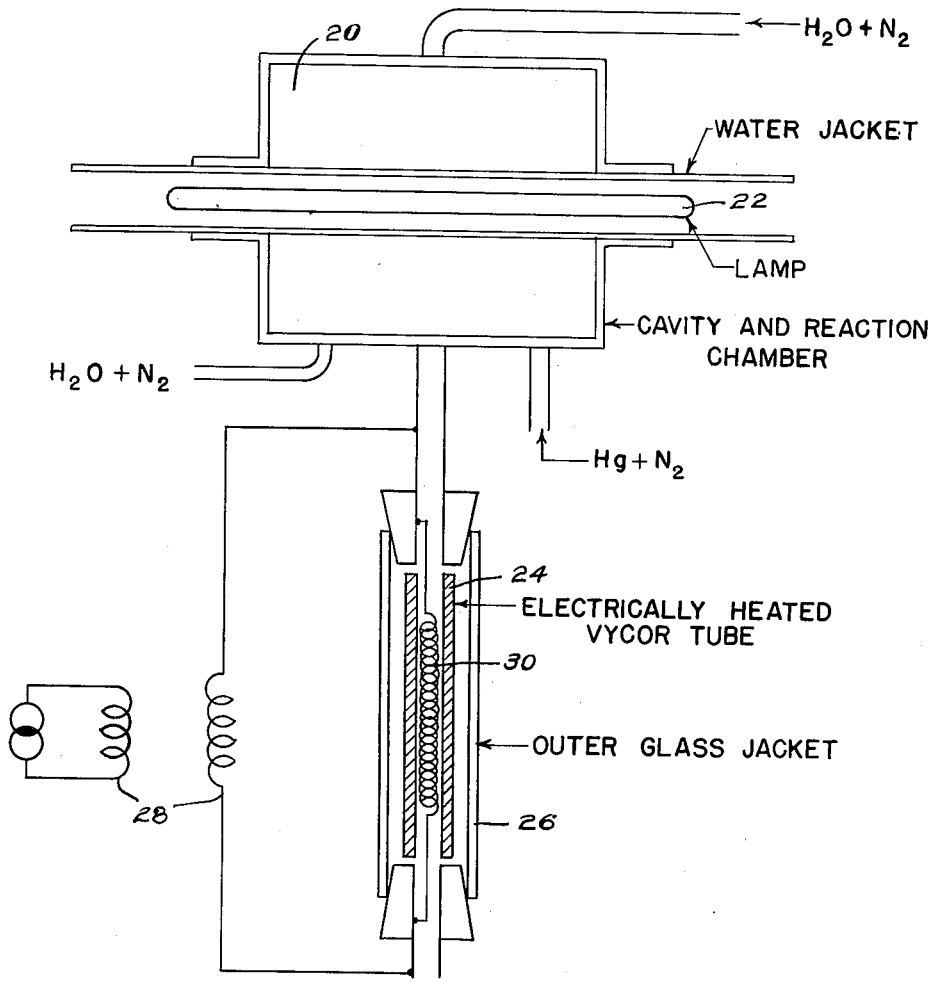
Fig. 5 is a diagrammatic view of a modified apparatus of the invention.

The reactions desired to be carried out may be caused to take place in various other types of equipment such as, for example, that illustrated in Fig. 5 which is representative of a continuous flow technique. In the apparatus of Fig. 5 there is shown a reaction chamber 20 through which is located a mercury tube 22 of the type described above. Extending downwardly from the reaction chamber is provided a tube 24 of the type commonly known as a Vicor tube. A glass jacket 26 is arranged around this member, as illustrated. Suitable electrical connections, including a transformer 28, is provided to energize the coil 30 in the Vicor tube 24.

It is contemplated that various materials may be introduced into the cavity 20, along with water, and mixed under suitable temperature and pressure conditions with mercury vapor. Any product of the reaction constituting a heavy molecule tends to be driven to the cool outer glass jacket 26 on leaving the chamber and to become deposited on the jacket as a film or coating. This is washed off with nitric acid and the mercury removed as copper amalgam on adding an excess of copper in the form of a fine wire to the nitric acid. From the amalgamated end of this, mercury can readily be distilled into an evacuated glass tube to make an electrodeless lamp similar to the mercury 198 lamp.

While I have described a preferred embodiment of the invention in connection with the separation of mercury 198, it is contemplated that the invention is susceptible of embodiment in many other forms and may be practiced with chemical reactions and radiations which are suitable for other isotope mixtures as well as various other materials which are hard to separate chemically, or in other ways, and including mixtures of various atomic or molecular species in which one or more atomic or molecular species is to be separated without departing from the scope of the invention as defined by the appended claims.

I claim:

1. In a method of separating a mercury isotope from a mixture of mercury isotopes, the steps which comprise producing a mercury vapor in the presence of water, and then radiating the mixture of mercury isotopes with a source of light which contains only the particular variety of isotope to be separated as the exciting material, thereby to selectively excite a corresponding isotopic constituent of the mixture and produce a reaction between said isotopic constituent and the said water.

2. In a method of separating a mercury isotope from a mixture of mercury isotopes, the steps which comprise producing a mercury vapor in the presence of a reacting substance, then radiating the mixture of mercury isotopes with a source of light which contains only the particular isotope to be separated as the exciting material, thereby to selectively excite a corresponding isotopic constituent of the mixture and to produce a reaction between said isotopic constituent and the said reacting substance, and then isolating the reaction product.

3. That improved method of isotopic separation, which comprises radiating a mixture of mercury isotopes in the presence of a reacting substance with a source of light which includes only an isotopic constituent of the particular variety to be separated as the exciting material.

4. That improved method of isolating a mercury isotope, which comprises subjecting a fluid mixture of mercury isotopes and a reacting substance to the action of light to selectively excite only one of the mercury isotopic constituents of the mixture and to cause said excited mercury isotope to chemically react with the said reacting substance, said source of light being an electrically excited discharge tube containing only a purified isotope of mercury of the variety which is to be separated as the exciting material.

5. The improved method of claim 4 in which said excited isotope combines with the reacting substance and is removed from the reaction chamber by a continuous process.

6. The method of claim 1 in which said isotopic constituent of the mixture reacts with the water and is removed from the reaction chamber by a continuous process.

7. That improved method of mercury isotope isolation which comprises subjecting a fluid mixture of mercury isotopes and a mixture of reacting substances to the action of light to selectively excite only one of the mercury isotopic constituents of the mixture and to cause said excited mercury isotope to chemically react with at least one of the said reacting substances, said source of light being an electrically excited discharge tube containing a substantially purified isotope of mercury of the variety which is to be separated as the exciting material.

References Cited in the file of this patent

"Journal of Research of the National Bureau of Standards," vol. 44, May 1950, pages 447–455; paper by Meggers et al.

"Nature," vol. 136, page 796 (November 16, 1935).

"Zeitschrift für Physikalische Chemie," Abteilung B, vol. 21 (1933) pages 93 thru 114, and pages 136, 137 of article by Kuhn et al.